United States Patent [19]

Bishop et al.

[11] Patent Number: 4,910,683

[45] Date of Patent: Mar. 20, 1990

[54] METHOD AND APPARATUS FOR FRACTIONAL DOUBLE BUFFERING

[75] Inventors: Thomas G. Bishop, Apex; John D. Austin, Chapel Hill, both of N.C.

[73] Assignee: Sun Microsystems, Inc., Mountain View, Calif.

[21] Appl. No.: 287,390

[22] Filed: Dec. 20, 1988

[51] Int. Cl.$^4$ .................. G06F 15/62; G06F 3/14; G09G 1/02

[52] U.S. Cl. .................. 364/518; 364/521; 364/522; 340/729; 340/725; 340/799; 340/798

[58] Field of Search .................. 364/522, 518, 521; 340/728, 729, 723, 747, 750, 725, 732, 799, 798

[56] References Cited

U.S. PATENT DOCUMENTS

| | | | |
|---|---|---|---|
| 4,594,673 | 6/1986 | Holly | 364/522 |
| 4,700,181 | 10/1987 | Maine et al. | 340/747 |
| 4,774,506 | 9/1988 | Bossoutrout et al. | 340/725 |
| 4,821,210 | 4/1989 | Rumbaugh | 364/518 |
| 4,835,532 | 5/1989 | Fant | 340/728 |

OTHER PUBLICATIONS

Levoy, "The Use of Points as a Display Primitive", The University of North Carolina Computer Science Department.

*Primary Examiner*—Gary V. Harkcom
*Assistant Examiner*—Raymond J. Bayerl
*Attorney, Agent, or Firm*—Blakely, Sokoloff, Taylor & Zafman

[57] ABSTRACT

A user, through the use of an input device, provides signals indicative of x,y and z coordinates to a host central processing unit (CPU). The x,y and z coordinates provided by a user correspond to a desired viewpoint for the display of an object stored in an original data image memory. A graphics CPU is coupled to the host CPU for receipt of the x,y and z coordinates as well as to the original data image memory. The graphics CPU is further coupled to a program memory as well as two display buffers, each of which of comprises a bit map of points on the display. The graphics CPU, executing a rendering program stored in the program memory, renders (writes) the data comprising the object for the viewpoint corresponding to the x,y and z coordinates provided by the user. After a predetermined percentage (N) of data comprising the object have been rendered into the non-displayed buffer, the graphics CPU signals a multiplexor which couples the display to the previously non-displayed display buffer, thereby displaying the predetermined percentage (N) of data which have been rendered. In the event that the user does not provide any new x,y and z coordinates representing a different viewpoint, the graphics CPU continues to render the data comprising the object into the displayed buffer, resulting in the appearance to the user that the object is "sparkling" into view. If, however, after the graphics CPU displays the predetermined N percentage of data points, the user provides new x,y,z coordinated corresponding to a different viewpoint, the graphics CPU ceases rendering the object data corresponding to the previous viewpoint, and begins rendering randomized data corresponding to the current viewpoint into the non-displayed display buffer.

9 Claims, 4 Drawing Sheets

METHOD AND APPARATUS FOR FRACTIONAL DOUBLE BUFFERING

BACKGROUND OF THE INVENTION

1. Field of the Invention:

The present invention relates to apparatus and methods for displaying three dimensional graphic images on a display. More particularly, the present invention relates to data processing apparatus and methods for generating and manipulating images on a display system.

2. Art Background:

In many computer systems, it is common to display graphic data in three dimensional form on a display. The generation of three dimensional images for real time display on a two dimensional cathode ray tube (CRT) requires that large amounts of data be processed prior to the display of the image. In particular, any change of the relative viewpoint of the data from the perspective of the user requires the computer display system to recalculate and redisplay all points comprising the displayed image from the new viewpoint. A variety of algorithms have been developed which permit three dimensional images to be displayed with appropriate hidden line elmination and depth perspective.

One historic problem associated with the display of a three dimensional image is the requirement that all points comprising the image be "rendered" (written) into a display buffer memory prior to, or concurrent with, the display of the image. Since an image may comprise hundreds of thousands of data points, the generation of a complex image may require a significant period of time. If a user wishes to modify the viewpoint of the image to be displayed, the display system must re-render all the points comprising the image in the display buffer.

Historically, two techniques have been used when displaying computer generated imagery: single buffering and double buffering. With single buffering the image is rendered completely visible to the user and so the user is distracted by the construction of the image.

In order to improve the image display, some computer display systems employ "double buffering", wherein two display buffer memories are alternated between one another, such that while the computer display system writes data corresponding to an image in the currently non-displayed buffer memory, the image data in the other buffer memory is displayed. Once the rendering of the image in the non-displayed buffer memory is complete, the display system selects the previously non-displayed buffer and displays its image while the other buffer memory image data is updated. The use of double buffering permits three dimensional objects to be displayed from different viewpoints with smooth motion.

For those images which comprise visually complex textures and/or require large amounts of displayed data, the time required for the computer system to render an image relative to a viewpoint may be significant. Accordingly, even with double buffering, the time between the change of view and the subsequent update of the image may be quite long. This results in a lag between user input and display that makes interaction difficult.

As will be described, the present invention provides apparatus and methods for modifying and viewing three dimensional images on a display system. The present invention overcomes the problems associated with displaying complex images by rendering a user selected percentage of the data prior to display to the user. After the predetermined percentage of data has been rendered, the image is displayed until the user once again modifies the viewpoint. The present invention permits a user to select a predetermined percentage of data to be displayed, and to quickly rotate the image in three dimensions until a desired viewing angle is obtained. This allows the user to trade-off speed of display updates for quality of image while the object is being rotated.

SUMMARY OF THE INVENTION

An apparatus and method is disclosed which has application for use in computer controlled display systems, and in particular, display systems which display three dimensional objects. A user, through the use of an input device, provides signals indicative of object rotation about the x,y and z axis, to a host central processing unit (CPU). These rotations provided by a user correspond to a desired viewpoint for the display of an image stored in an original data image memory. A graphics CPU is coupled to the host CPU for receipt of the x,y and z coordinates as well as to the original data image memory. The graphics CPU is further coupled to a program memory as well as two display buffers, each of which of comprises a bit map of points on the display. The graphics CPU, executing a rendering program stored in the program memory, renders (writes) the data comprising the object for the viewpoint corresponding to the x,y and z coordinates provided by the user. After a predetermined percentage (N) of data comprising the object have been rendered into the non-displayed buffer, the graphics CPU signals a multiplexor which couples the display to the previously non-displayed display buffer, thereby displaying the predetermined percentage (N) of data which have been rendered. In the event that the user does not provide any new x,y and z coordinates representing a different viewpoint, the graphics CPU continues to render the data comprising the object into the displayed buffer. If the original data is randomized, the appearance to the user is that of the object "sparkling" into view. If, however, after the graphics CPU displays the predetermined N percentage of data points, the user provides new x,y and z coordinates cooresponding to a different viewpoint, the graphics CPU ceases rendered the object data cooresponding to the previous viewpoint, and begins rendering data cooresponding to the current viewpoint into the non-displayed display buffer. By appropriately setting the percentage (N) of data which are to be displayed prior to changing viewpoints, a user may rapidly modify the viewpoint of the displayed object until a satisfactory angle of view is found. The object will then "sparkle" into view until 100% of the data are displayed or the user once again provides a modified viewpoint to display the three dimensional image.

NOTATION AND NOMENCLATURE

The detailed descriptions which follow are presented largely in terms of algorithms and symbolic representations of operations of data bits within a computer memory. These algorithmic descriptions and representations are the means used by those skilled in the data processing arts to most effectively convey the substance of their work to others skilled in the art.

An algorithm is here, and generally, conceived to be a self consistant sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signal as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention. In the present case, the operations are machine operations. Useful machines for performing the operations of the present invention include general purpose digital computers or other similar devices. In all cases there should be borne in mind the distinction between the method operations of operating a computer and the method of computation itself. The present invention relates to method steps for operating a computer and processing electrical or other physical signals to generate other desired physical signals.

The present invention also relates to apparatus for performing these operations. This apparatus may be specially constructed for the required purposes or it may comprise a general purpose computer selectively activated or reconfigured by a computer program stored in the computer. The algorithms presented herein are not inherently related to any particular computer or other apparatus. In particular, various general purpose machines may be used with programs in accordance with the teachings herein, or it may prove more convenient to construct more specialized apparatus to perform the required method steps. The required structure for a variety of these machines will appear from the description given below. In addition, the present invention is not described with reference to any particular programming language. It will be appreciated that a variety of programming languages may be used to implement the teachings of the invention as described herein.

DETAILED DESCRIPTION OF THE INVENTION

In the following description improved apparatus and methods are described for displaying data in a computer display system. In the following description, numerous specific details are set forth such as various computer operations such as comparing, rendering, illustrative algorithmic conventions, etc. in order to provide a more thorough understanding of the present invention. However, it will be apparent to one skilled in the art that the present invention maybe practiced without these specific details. In other instances, well known circuits and structures are not described in detail and are shown in block diagram form in order not to obscure the present invention unnecessarily.

Figure 1:
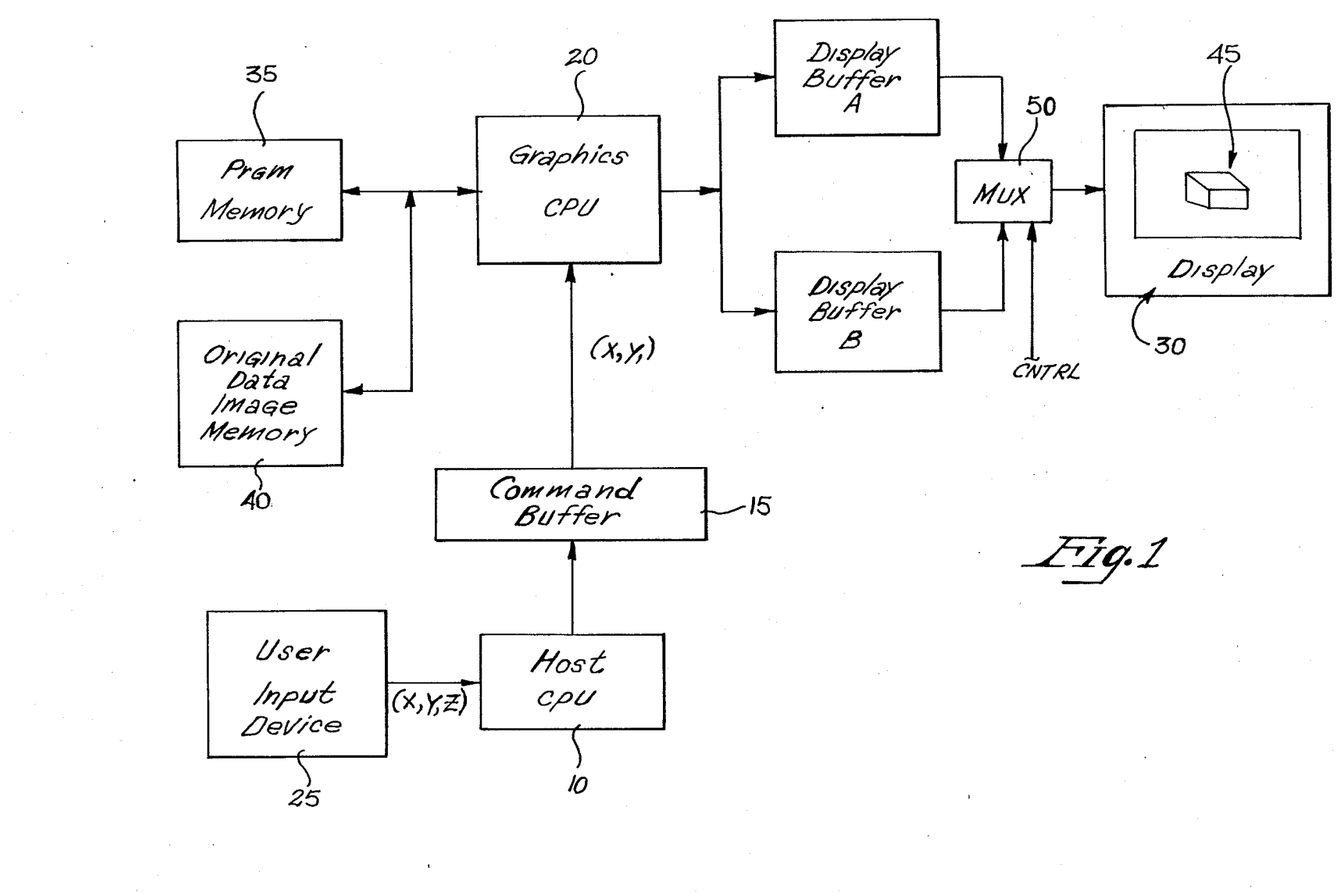
FIG. 1 illustrates a computer display system incorporating the teachings of the present invention.

Referring now to FIG. 1, a computer display system incorporating the teachings of the present invention is shown. As illustrated, a host CPU 10 interacts with the user (not shown) to supply signals and commands through a command buffer 15 to a graphics central processing unit (CPU) 20. As will be described, a user utilizes an input device 25 coupled to the host CPU 10, to provide signals indicative of object rotation about the x,y and z axis to the host CPU. The input device 25 may comprise one of a variety of input devices currently available, such as for example and not limitation, an electronic "mouse", a track ball, electric dials, potentiometers, or a light pen. Typically, the input device 25 comprises a mouse and is used in conjunction with data to be displayed, such that a cursor may be moved on the screen of a raster display 30 in accordance with the movement of the input device 25 over a surface. However, in the present invention, the input device 25 is utilized to provide x,y signals which corresponds to a viewpoint for viewing a three dimensional object on the display 30 and the z coordinate is assumed to be fixed. By modifying the x,y signals provided to the display system, the user may alter the object and selectively rotate the object on the display.

As shown in FIG. 1, signals indicative of the x,y coordinates are provided by the user through input device 25 to the host CPU 10. These signals are appropriately transmitted to the command buffer 15 which is coupled to the graphics CPU 20. The graphics CPU 20 executes a variety of computer graphics programs stored in program memory 35, and is also coupled, as shown, to an original data image memory 40. The original data image memory 40 includes data representing an image which is to be displayed to the user, such as three the dimensional cube 45 on display 30. This data represents the original object to be displayed and includes all data points (visible or hidden) which describe the particular object forming the image. In this implementation, the object is defined by points. These points define a location in space and have an associated normal vector; their union represents the surface or other property of the object. The technique of fractional double buffering will work with any display primitive (e.g. lines, polygons and the like).

The object of cube 45 is "rendered" on the two dimensional display 30 utilizing one of variety of known algorithms for rendering computer generated images. In many systems, various display primitives are used to define the particular object to be displayed, for example cube 45. Examples of display primitives include lines, curves or polygons in two dimensions or polyhedrals in three dimensions. The rendering consists of converting the geometric primitives into a two dimensional array of pixels viewed on the raster display 30. In the presently preferred embodiment, the data points stored within the original data image memory 40 are used as the display primitive. The points are rendered by the graphics CPU 20 based upon the particular rendering algorithms stored within the program memory 35. (See, Levoy, "The Use of Points as a Display Primitive" The University of North Carolina Computer Science Department; and, Bergman, "Image Rendering by Adaptive Refinement", ACM Siggraph Proceedings, Aug. 18-22, 1986.)

In the embodiment of FIG. 1, graphics CPU 20 executes a rendering algorithm and reads the original image data stored in the memory 40. Graphics CPU 20 is provided with the x,y and z coordinate information corresponding to a viewpoint to view the object on display 30 through host CPU 10. As shown, the system includes a display buffer A and a display buffer B. The use of two alternately written display buffers permits the present invention to utilize "double buffering", which is well known in the art. Double buffering permits the graphics CPU 20 to "render" (write) the object to be displayed into the display buffer which is not currently being displayed. While the graphics CPU 20 is rendering (writing image data) into, for example display buffer A, data comprising an object previously rendered in display buffer B is provided to the display 30.

Accordingly, in the present embodiment one of the display buffers is updated with new object data while the other display buffer is read by the display circuitry and its object displayed on the display 30. A multiplexor 50, controlled by graphics CPU 20, alternately selects display buffer A and display buffer B, and presents data from the currently selected buffer to the display 30 upon receipt of a control signal from graphics CPU 20.

Assume for sake of example that cube 45 is to be displayed by the graphics CPU 20. The graphics CPU 20 receives x,y and z coordinate information from the user input device 25 through the host CPU 10, which corresponds to a particular viewpoint (angle) relative to the user from which the cube 45 is to be displayed. Graphics CPU 20, in accordance with a rendering algorithm stored in program memory 35, reads the original object data for cube 45 from the original data image memory 40. The graphics CPU 20 then "renders" the cube 45 in accordance with the rendering algorithm and writes data representative of the cube 45 for the selected viewpoint into display buffer A. In the presently preferred embodiment, both display buffer A and display buffer B comprise bit-mapped memories, in which there is a one to one corrspondence with the pixels comprising the raster display 30 and the storage locations in each display buffer. Since bit-mapped memories in conjunction with display systems are well known in the art, this Specification will not describe the operation of the bit-mapped memories in any further detail. Once the image of cube 45 has been rendered and written into the display buffer memory A as described below, graphics CPU 20 issues appropriate control signals to the multiplexor 50 such that the data now stored within the display buffer A is read by the display 30 and the cube 45 is displayed, as shown in FIG. 1. If the displayed object is to be modified, graphics CPU 20 then renders (writes) the updated object data into the display buffer B while display buffer A is being read by the display circuitry and transmitted to display 30.

It will be appreciated by one skilled in the art, that a significant time lapse exists between the display of objects rendered in the display buffer A and the display of the updated object written into display buffer B. For example, by requiring that all visible data be rendered in the display buffers prior to the object being displayed, any modifications to the object which would subsequently be reflected in the non-displayed buffer memory would only be displayed upon the complete rendering and display of the object disposed in the memory currently being displayed. Accordingly, it is difficult to achieve a true interactive image generation system in which the user selects a viewpoint based on x,y and z coordinates generated by the user input device 25, and views the object displayed in the chosen viewpoint in real time.

It has been suggested by Levoy in "The Use of Points as a Display Primitive" that data comprising the object be randomized prior to rendering them in the display buffer. Points comprising the object are then rendered and displayed in a random order, thereby giving the user an immediate impression of the object on the display. As the remaining points comprising the object are displayed, the object appears to "sparkle" in until 100% of the points comprising in the object have been rendered. Any manipulation of the viewpoint (by changing the inputted x,y and z coordinate from the input device 25), and thereby the viewpoint, results in the immediate termination of the rendering of the current object, and the new points being rendered in the display buffer based on the updated viewpoint.

Although Levoy conceptually described a system based on the randomization and display of points, he did not implement his system to achieve the interactive image synthesis which he envisioned. Moreover, the system described by Levoy does not relate to a double buffered system, but rather a single buffered image generation system in which the object is only fully generated and displayed if the user does not modify the viewpoint by altering the inputted x,y and z coordinate. As the points are rendered, they are written into the single display buffer and immediately displayed.

Figure 2:
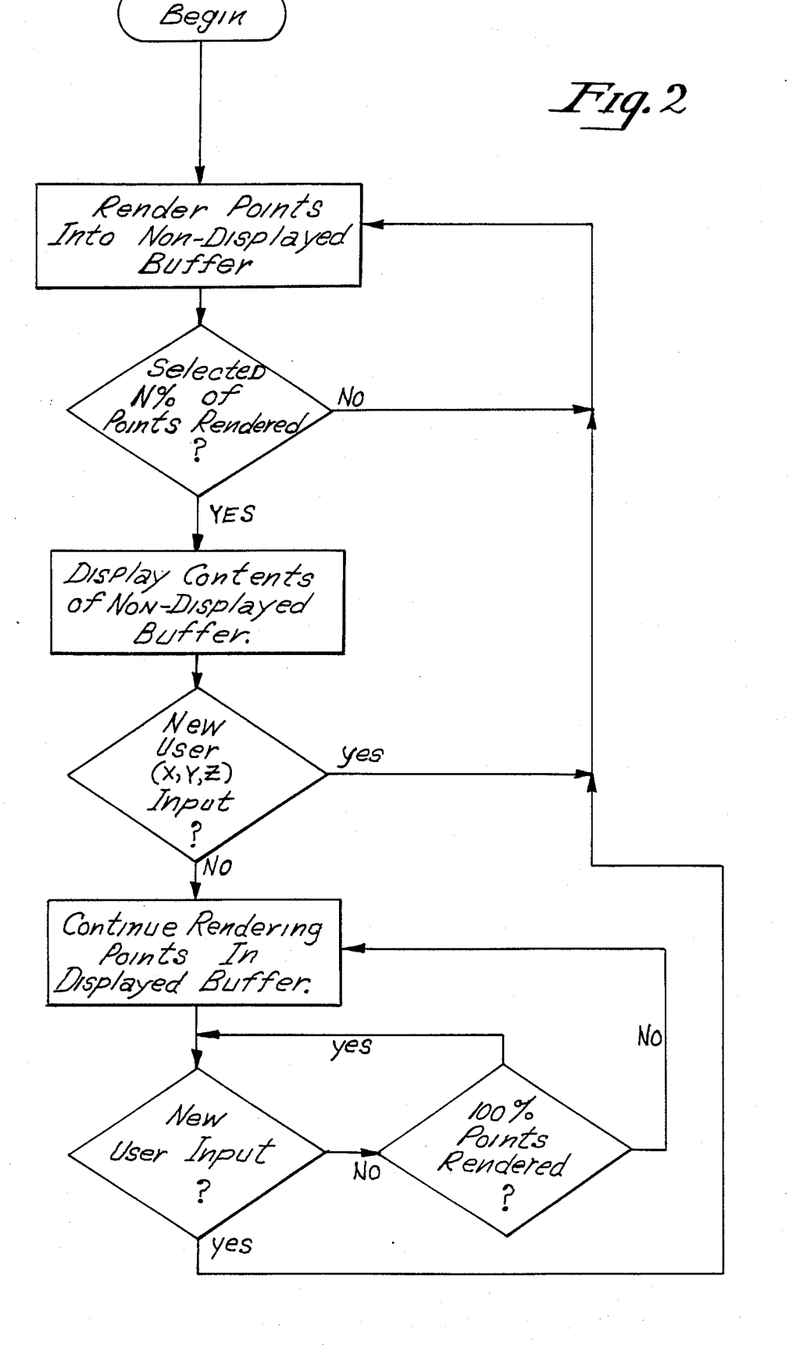
FIG. 2 is a flow chart illustrating the sequence of operations of the present invention.
Figure 3:
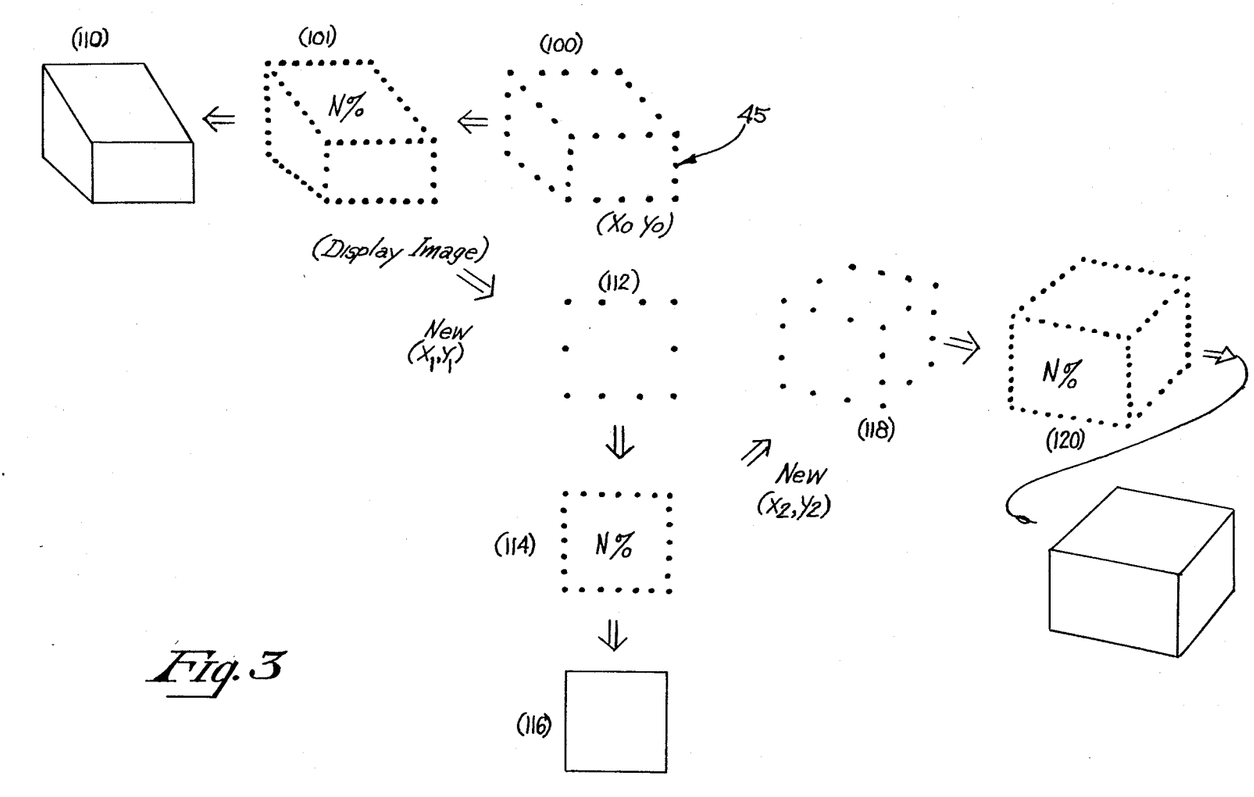
FIG. 3 symbolically illustrates the present invention's use of fractional double buffering techniques to display images.

In accordance with the teachings of the present invention, and referring now to FIGS. 1,2 and 3, data defining an object to be displayed (such as cube 45 in FIGS. 1 and 3) is stored in memory 40. In the presently preferred embodiment, graphics CPU 20 may render 225,000 points per second, the rendering being controlled by a rendering algorithm stored within the program memory 35. As illustrated in the flow chart of FIG. 2, graphics CPU 20 receives initial (x0,y0) coordinates from the user input device 25 defining a viewpoint of the object to be displayed. Graphics CPU 20 previously randomized points which are visible for the initial (x0,y0) viewpoint, into the display buffer currently not being displayed (for example display buffer A). In accordance with the teachings of the present invention, a selected percentage (N) of the total data points rendered are then written into the nondisplayed buffer A by graphics CPU 20. The percentage N of the total points to be rendered represents a guaranteed minimum percentage of the object to be written into the selected display buffer.

Referring to the flow chart of FIG. 2, the data points comprising the object to be displayed are first randomized prior to rendering. The requirement that a selected percentage of the points comprising the image be rendered guarantees that prior to a modification of a (x,y) viewpoint, N percentage of the object will be generated for the user to view. Once the selected (N) percentage of points is rendered in the nondisplayed buffer, graphics CPU 20 displays the contents of the previously nondisplayed buffer on display 30. Graphics CPU 20 then determines if the current x,y coordinates provided by the user input device 25 is the same as the previous x0,y0 coordinate. If the user has not provided a new x,y coordinate, and therefore a new viewpoint for the object, then graphics CPU 20 continues rendering the remaining percentage of the points in the currently displayed buffer until 100% of the points comprising the object are rendered, or the user inputs a new x,y coordinate. As shown in FIG. 2, once the predetermined (N) percentage of points have been rendered, any change in the x,y viewpoint by the user interrupts the rendering process and results in the graphics CPU writing new object data into the alternate nondisplayed buffer based on the updated viewpoint. However, if a user does not modify the viewpoint then the object will be fully rendered, and will appear to "sparkle" onto the display as the points are written into the displayed frame buffer in a random order.

Figure 4:
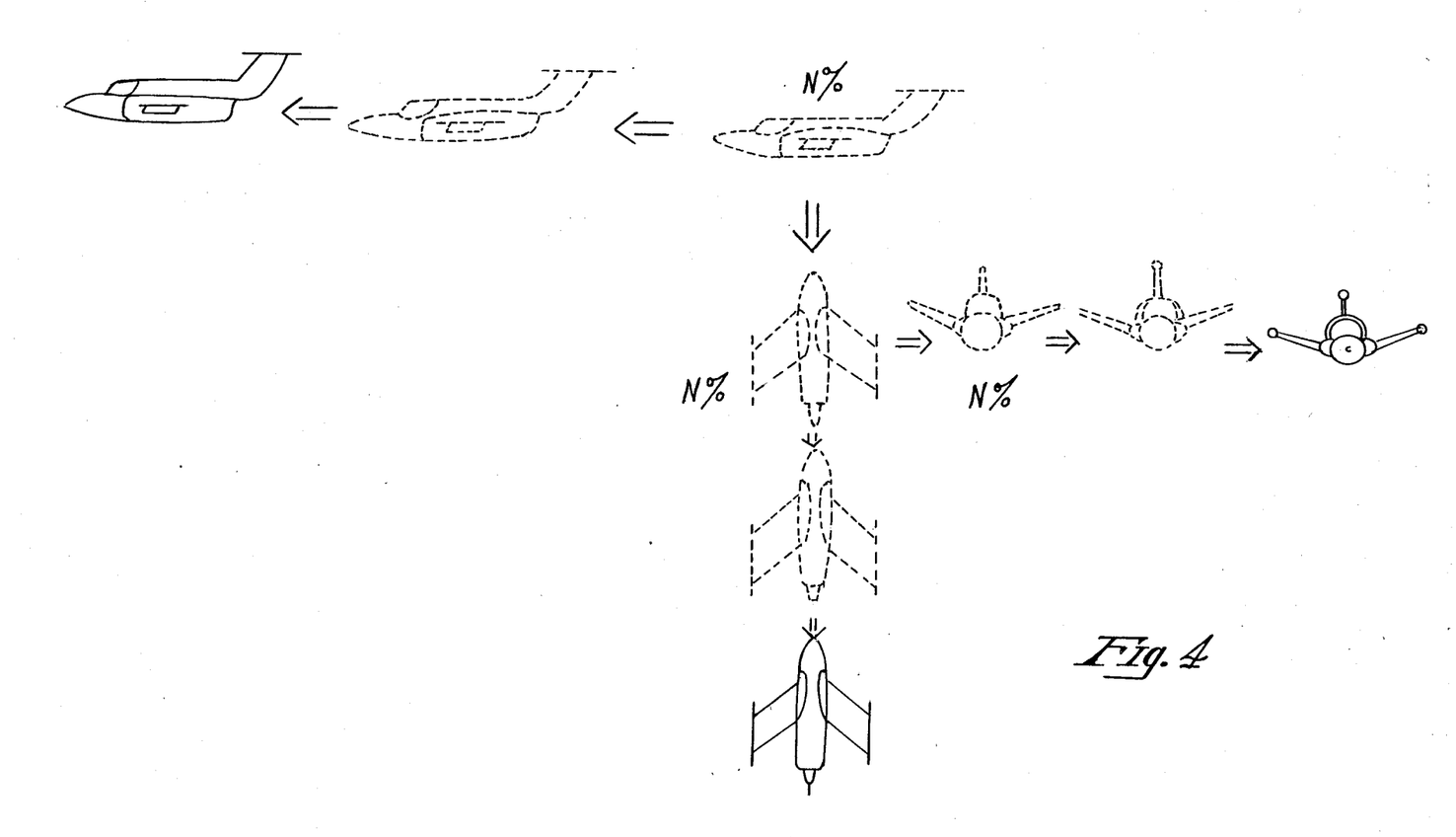
FIG. 4 symbolically illustrates another example of the use of the present invention to display images utilizing fractional double buffering.

Referring now to FIGS. 3 and 4, the operation of the present invention is illustrated with reference to two examples. In FIG. 3, cube 45 is shown as it may appear on display 30. Initially at location 100 of FIG. 3, the cube is rendered into the nondisplayed display buffer memory (such that it is not yet visible on display 30), and the points are written into the buffer memory in a random order. At position 101, after a predetermined percentage (N) of the points comprising the cube 45 have been written into the nondisplayed memory, graphics CPU 20 displays cube 45. If the user does not modify the viewpoint then the entire cube is displayed as shown in position 110 and would appear to "sparkle" onto the display as the remaining points are displayed in random order. However, as shown in FIG. 3, if the user modifies the viewpoint by altering the inputted x,y coordinates (in the present example from a perspective to an end view) then the rendering of cube 45 based on the initial x,y coordinate ceases and graphics CPU 20 begins rendering cube 45 in the currently nondisplayed buffer, as shown symbolically at position 112 of FIG. 3. Once again, after a predetermined percentage (N) of the points comprising the object to be displayed is written into the nondisplayed buffer (shown conceptually as position 114), graphics CPU 20 displays the image on display 30. If the user does not input a new viewpoint (x2,y2) then the object based on position (x1,y1) continues to be rendered and will "sparkle" on the display as shown by position 116. A modification to the viewpoint (x2,y2) results in the object being rendered based on the new viewpoint (shown at position 118) until the predetermined percentage of points has been rendered in the nondisplayed buffer (120).

Referring now to FIG. 4, the image of an aircraft is illustrated in which the percentage (N) of points comprising the guaranteed the number of points to be rendered is set low. It will be appreciated, that by setting the percentage of guaranteed points sufficiently low, the user may alter viewpoint in real time utilizing the user input device 25, and thereby alter the viewpoint of the object very rapidly. Once a desired viewpoint is selected by the user, the full image of the aircraft will sparkle onto the display.

Accordingly, apparatus and methods have been described for displaying data in a computer display system. Although no particular programming language has been indicated for carrying out the various procedures described in this Specification, a user of a particular computer will be aware of the language which is most suitable for his immediate purposes. In practice, it has proven useful to substantially implement the present invention in an Assembly language which provides a machine executable object code. Because the computers and the monitor systems which may be used in practicing the instant invention consist of many diverse elements, no detailed program listings have been provided. It is considered that the operations and other procedures described above and illustrated in the accompanying drawings are sufficiently disclosed to permit one of ordinary skill to practice the instant invention or so much of it as is of use to him.

The present invention's unique apparatus and methods permit rapid display and update of three dimensional images on a display screen. While the present invention has been particularly described with reference to FIGS. 1-4, it should be understood that the Figures are for illustration only and should not be taken as limitations upon the invention. For example, although the present invention has been described for use with three dimensional images, the invention is also applicable for use in displaying two dimensional images. In addition, it is clear that the method and apparatus of the present invention has utility in any application where graphics are to be displayed on a CRT or other display device. It is further contemplated that many changes and modifications may be made, by one of ordinary skill in the art, without departing from the spirit and scope of the invention as disclosed above.

We claim:

1. A computer display system, said system including a display for displaying an object, wherein said object comprises a plurality of display primitives, said display coupled to a graphics central processor unit (CPU), comprising:

(a) original data image memory means coupled to said graphics CPU for storing data representative of said plurality of display primitives comprising said object;

(b) user input device means coupled to said graphics CPU for providing signals indicative of x,y coordinates on said display, said x,y coordinates corresponding to a viewpoint such that said object appears to be rotated on said display as viewed by a user in accordance with said current x,y coordinates;

(c) first and second display buffers coupled to said graphics CPU, and to multiplexor means, said multiplexor means coupled said display buffers and said display, said multiplexor means being controlled by said graphics CPU, such that either said first or second display buffer is selected for display at any one time;

(d) said graphics CPU including rendering means for displaying those of said primitives which are visible to said user from a viewpoint, said rendering means writing data representative of a predetermined percentage (N) of the total visible primitives to be displayed for the viewpoint corresponding to a first x,y coordinate value into one of said display buffers not currently selected;

(e) sensing means coupled to said graphics CPU for sensing if said data representing said N percentage of visible primitives for said first x,y coordinate value has been written into said non-selected display buffer, said sensing means then signalling said graphics CPU such that said graphics CPU provides a signal to said multiplexor and said N percentage of visible primitives comprising said object at said current x,y coordinates are displayed, said sensing means determining once said N percentage of said visible primitives are displayed if said current and first x,y coordinates are the same; in the event said current and first x,y coordinates are the same said rendering means continuing to write data representing said primitives cooresponding to said object at said first x,y coordinate until 100% of said data representing said visible primitives are displayed, or said current x,y coordinate differs from said first x,y coordinate;

(f) if said current x,y coordinate differs from said first x,y coordinate once said N percentage of points have been displayed, said graphics CPU ceases writing said data into said currently displayed buffer, and begins writing data corresponding to said visible primitives for said current viewpoint into said buffer not currently being displayed.

2. The display system as defined by claim 1, wherein said graphics CPU randomizes said data representing said display primitives prior to writing said data into one of said display buffers.

3. The display system as defined by claim 2, wherein said primitives comprise points.

4. The display system as defined by claim 3, wherein said input means further provides signals indicative of z coordinates to said graphics CPU, such that said object appears to be rotated on said display in accordance with said x,y and z signals.

5. The display system as defined by claim 4, further including a host CPU coupled between said input means and said graphics CPU for providing said x,y,z coordinates from said input means to said graphics CPU.

6. The display system as defined by claim 5, wherein said user input device means is coupled through said host CPU and comprises an electronic mouse.

7. In a computer display system, said system including a display for displaying an object, wherein said object comprises a plurality of display primitives, said display coupled to a graphics central processing unit (CPU), and said system further including original data image memory means coupled to said graphics CPU for storing data representative of said plurality of primitives comprising said object, said system further including user input device means coupled to said graphics CPU for providing signals indicate of x,y coordinates on said display, and first and second display buffers coupled to said graphics CPU and to multiplexor means, said multiplexor means coupled to said display, such that either said first or second display buffer is selected for display at anyone time, a method for displaying said data comprising the steps of:

(a) said graphics CPU writing data reperetative of a predetermined percentage (N) of said total visible primitives into one of said display buffers not currently selected on said display, at a position corresponding to a first viewpoint identified by a first x,y coordinate value provided by said user input device means, said graphics CPU providing a signal to said multiplexor means once said N percentage has been written into said buffer, such that said buffer is selected and said N percentage of said primitives are displayed on said display;

(b) determining, after said N percentage of primitives for said first x,y coordinate value have been displayed, if said current x,y coordinate provided by said user input device means differs from said first x,y coordinate, said remaining primitives for said first x,y coordinate value being displayed if said coordinate are the same until all of said primitives are displayed or said current x,y coordinate differs from said first x,y coordinate; in the event said current and first x,y coordinates differ, said graphics CPU ceasing display of primitives for said first x,y coordinate value and writes data into said second display buffer, said data representative of a predetermined percentage (N) of said primitives for a second viewpoint corresponding to a second x,y coordinate value.

8. In a computer display system, said system including a display for displaying an object, wherein said object comprises a plurality of display primitives, said display coupled to a graphics central processing unit (CPU), and said system further including original data image memory means coupled to said graphics CPU for storing data representative of said plurality of display primitives comprising said object, said system further including user input device means coupled to said graphics CPU for providing signals indicative of x,y,z coordinates on said display and first and second display buffers coupled to said graphics CPU and to multiplexor means, said multiplexor means coupled to said display, such that either said first or second display buffer is selected for display at any one time, a method for displaying said data, comprising the steps of:

(a) said graphics CPU writing data representative of a predetermined percentage (N) of said total visible display primitives into said first display buffer not currently selected, at a position in said first display buffer corresponding to a first viewpoint identified by a first x,y,z coordinate value provided by said user input means; said graphics CPU providing a signal to said multiplexor means once said N percentage has been written into said first buffer, such that said buffer is selected and said N percentage of said primitives are displayed on said display;

(b) determining, after said N percentage of primitives have been displayed, if said current x,y,z coordinates provided by said user input device means differs from said first x,y,z coordinates, said graphics CPU continuing to write data representative of said first viewpoint into said first buffer if said first and current x,y,z coordinates remain the same until all of said remaining visible primitives are displayed, or in the event said current x,y,z coordinates differ from said first x,y,z coordinates, said graphics CPU ceases writing data to said first buffer, and writes data to said second non-displayed buffer corresponding to said current x,y,z coordinate for a second viewpoint.

9. The method as defined by claim 8, wherein said graphics CPU randomizes said data representing said display primitives prior to writing said data into one of said display buffers.

* * * * *

UNITED STATES PATENT AND TRADEMARK OFFICE
CERTIFICATE OF CORRECTION

PATENT NO. : 4,910,683
DATED : 3/20/90
INVENTOR(S) : Bishop et al.

It is certified that error in the above-identified patent and that said Letters Patent is hereby corrected as shown below:

| | | |
|---|---|---|
| col. 01, line 25 | delete "elmination" | insert --elimination-- |
| col. 02, line 46 | delete "cooresponding" | insert --corresponding-- |
| col. 02, line 47 | delete "rendered" | insert --rendering-- |
| col. 02, lines 47-48 | delete "cooresponding" | insert --corresponding-- |
| col. 02, line 49 | delete "cooresponding" | insert --corresponding-- |
| col. 04, line 55 | before "variety" | insert --a-- |
| col. 05, line 45 | delete "corrspondence" | insert --correspondence-- |
| col. 08, line 45 | after "coupled" | insert --between-- |
| col. 09, line 04 | delete "cooresponding" | insert --corresponding-- |
| col. 09, line 50 | delete "repreentative" | insert --representative-- |
| col. 10, line 07 | delete "coordinate" | insert --coordinates-- |
| [57]Abstract, line 29 | delete "coordinated" | insert --coordinates-- |

Signed and Sealed this

Fifth Day of November, 1991

Attest:

HARRY F. MANBECK, JR.

*Attesting Officer*     *Commissioner of Patents and Trademarks*